United States Patent

Mizutani et al.

[15] 3,647,086
[45] Mar. 7, 1972

[54] CATION EXCHANGE MEMBRANE AND METHOD OF MAKING SAME

[72] Inventors: Yukio Mizutani; Reiichi Yamane; Toshikatsu Sata, all of Tokuyama-shi; Ryuji Izuo, Kudamatsu-shi, all of Japan

[73] Assignee: Tokuyama Soda Kabushiki Kaisha, Tokuyama-shi, Japan

[22] Filed: July 9, 1969

[21] Appl. No.: 840,513

[52] U.S. Cl. .............................. 210/500, 204/296, 260/2.2
[51] Int. Cl. ........................................................ B01d 39/16
[58] Field of Search ............................ 210/22, 23, 321, 500; 204/180 P, 296; 264/41.44; 260/2.2

[56] References Cited

UNITED STATES PATENTS

| | | | |
|---|---|---|---|
| 3,276,989 | 10/1966 | Nishihara et al. | 204/296 |
| 3,370,021 | 2/1968 | Kohn et al. | 260/2.2 |
| 3,388,080 | 6/1968 | Korosy et al. | 204/296 X |
| 3,510,418 | 5/1970 | Mizutani et al. | 204/180 P X |

Primary Examiner—Frank A. Spear, Jr.
Attorney—Sherman and Shalloway

[57] ABSTRACT

A cation exchange membrane comprising a membranous insoluble, infusible organic high-molecular-weight polymer having cation exchange groups chemically bonded thereto and having the dimension of at least 1 centimeter in two directions, the substantial surface of said membrane being chemically bonded with acid amide bonds in a proportion such that the percentage indicated by the following equation is satisfied:

$$A/(A+B) \times 100 = 15 - 10^{-5}\%$$

wherein $A$ is the number of acid amide bonds per gram of dry membrane and $B$ is the number of cation exchange groups per gram of dry membrane, said acid amide bonds being composed of a cation exchange group and an amine having one amino group containing at least one hydrogen atom bonded to a nitrogen atom and a method of making the same.

11 Claims, No Drawings

CATION EXCHANGE MEMBRANE AND METHOD OF MAKING SAME

This invention relates to a cation exchange membrance having the property of selectively effecting the permeation of cations of smaller valence from a solution containing two or more classes of cations of differing valence, and to a method of making same. More particularly, the invention relates to a cation exchange membrane having permselectivity between cations, characterized by having acid amide bonds in its surface or neighborhood of its surface (hereinafter this surface inclusive of its neighborhood being referred to as the substantial surface); and to a method of making same.

It has been known in the past to effect the separation of acid or base, concentration of salt water, desalting or the double decomposition by using the ion exchange membrane. In these cases, the ion exchange membranes (usually referred to respectively as the cation exchange membrance and the anion exchange membrane) which have the property of effecting the selective permeation of the cations and anions are used either independently of each other or in combination.

As ion exchange membranes which can stand commercial use, the requirement is that they have low electric resistance, the transport number of the ions whose transport through the membrane is desired is great and the strength, and especially the dimensional stability, of the membrane itself is great. The various cation exchange membranes which have been proposed for commercial use in the past can be classified as follows:

a. The nonhomogeneous ion exchange membrane. A mixture of a cation exchange resin powder and a thermoplastic powder formed into membrane form. For example, those disclosed in U.S. Pat. Nos. 2,681,319, 2,681,320 and 2,827,426, British Patent specification No. 810,391, and Japanese Patent applications Publication Nos. 9477/1957 and 7720/1959.

b. Interpolymer membranes (casting membranes). Those obtained by dissolving polystyrene sulphonic acids in a solvent such as water, alcohol or dimethylformamide and dissolving therein a high-molecular-weight substance soluble in said solvent to become the reinforcing material, such, for example, as polyvinyl alcohol, vinyl chloride-acrylonitrile copolymer or collodion, and casting this solution onto a flat surface and thereafter evaporating the solvent and stripping the remaining film, and in the case the resulting film is one which is soluble insolubilizing it by cross-linking. For example, those disclosed in J. Phys. Chem. 58, 916–925 (1954), ibid. 61, 141 (1957), ibid. 61, 147–151 (1957); Discussions of Faraday Soc. 21, 162 (1956); and British Pat. specification No. 835,137.

c. Soaking process membranes. Those obtained by dipping a film such as of polyvinyl chloride, polyethylene, polypropylene and fluorine resins in a vinyl monomer or a vinyl monomer containing a cross-linking agent and, after the film has been thoroughly impregnated with the monomer, polymerizing it by radical, thermal, radiation or ionic polymerization and thereafter introducing an ion exchange group into the film. For example, those disclosed in the J. Polymer Sci. 23, 903–913 (1957); Denki Kagaku (The Electrochemical Society of Japan) 30, 335–337 (1962); Research Reports of Asahi Glass Company, Japan, 10, 117–128 (1960); and Japanese Pat. application Publication No. 4590/1957.

d. Membranes made from monomers having functional groups which can be changed readily to ion exchange groups. Those obtained by mixing a cross-linking agent such as divinylbenzene and divinylsulfone homogeneously with a vinyl monomer having a functional group which can be changed readily to an ion exchange group, such as the esters of vinyl monomers containing an exchange group (e.g., vinyl sulfonic acid esters, styrene sulfonic acid esters, methyl methacrylate and methyl acrylate) or vinyl sulfonyl chloride, then bulk polymerizing the resulting monomeric vinyl mixture using a radical initiator, after which the resulting polymer is made into membrane form and hydrolyzed to obtain the ion exchange membrane. For example, those disclosed in German (East) Pat. No. 18357 (1960), J. Phys. Chem. 59 No. 1, 86–89 (1955), Can, J. Chem. 32, 143 (1954) and Journal of Chemical Society of Japan 62, 1929–1934 (1959).

e. After-treated membranes (cation exchange membranes obtained by introducing an ion-exchange group into a membrane high-molecular-weight polymer into which an ion-exchanging group is capable of being introduced)

i. Cation exchange membranes obtained by the direct chlorosulfonation of sheets of such as polyvinyl chloride, polyethylene, and polypropylene with chlorosulfonic acid or by exposure to ultraviolet radiation using a gas mixture of $SO_2$ and $Cl_2$, followed by submitting the sheets to hydrolysis. For example, those disclosed in German Pat. No. 1,001,669, U.S. Pat. No. 2,948,637, Dutch Pat. No. 81298, and U.S. Pat. Nos. 2,767,575 and 2,858,264.

ii. Those obtained by mixing and dissolving a linear high-molecular-weight substance such as polystyrene and natural rubber with either styrene, divinylbenzene, dioctyl phthalate or benzoyl peroxide, heating and polymerizing this mixture to obtain a lumpy high-molecular-weight polymer, and thereafter cutting this polymer into thin pieces followed by a sulfonation treatment. For example, those disclosed in Japanese Pat. applications Publication Nos. 4142/1957, 4144/1957, 10696/1957, 2645/1958, 3892/1958, 5740/1958 and 7290/1960.

iii. Those obtained by dipping a glass fiber cloth or polyester cloth in a styrene-butadiene copolymer latex, after which the cloth is withdrawn and air-dried, followed by sulfonation with, say, 95% $H_2SO_4$ directly or after treating the impregnated cloth with either $SnCl_2$ or $TiCl_4$. For example, those disclosed in Japanese Pat. applications publication Nos. 13009/1960 and 4210/1961.

iv. Those obtained by mixing a mixed monomer solution predominantly of a monomer having a functional group suitable for the introduction of an ion exchange group with a finely divided, thermoplastic high-molecular-weight substance to yield a pasty product, which is formed into film and polymerized, after which ion exchange groups are introduced thereinto. For example, those disclosed in Japanese Pat. applications publication Nos. 19542/1964 and 28951/1965.

It is also proposed that for further augmentation of the mechanical strength of the hereinabove described cation exchange membranes a textile substance of net, fabric or yarn form be applied as a reinforcing material wherever possible.

However, since there was practically no permselectivity between the cations in the case of the conventional ion exchange membranes, it was not possible to permit the passage of only those cations which were particularly wanted. Attempts have been made to improve upon this drawback by developing a cation exchange membrane having permselectivity between the cations. These attempts can be classified as follows:

1. An ion exchange membrane of high cross-linked resin structure. [For example, that disclosed in Denki Kagaku 27, 482 (1959)]

2. A cation exchange resin membrane whereon has been formed a thin film of condensed high cross-linked resin [For example, those disclosed in Denki Kagaku 29, 544 (1961), and Japanese Pat. applications publication Nos. 3164/1961, 4210/1961 and 6647/1963]

3. An ion exchange membrane containing both anion and cation exchange groups. (For example, that disclosed in Japanese Pat. application publication No. 943/1960)

4. A membrane made up of a lamination of an anion exchange membrane and a cation exchange membrane. [For example, that disclosed in the Journal of Applied Chemistry 6, 511 (1956)]

5. An ion exchange membrane having a special exchange group, i.e., a phosphoric acid group. (For example, that disclosed in Japanese Pat. application publication No. 531/1965)

The foregoing attempts cannot be regarded as being fully established techniques in view of the following shortcomings: the membrane described in (1), above, has a high electric resistance, whereas that of (2) is poor in its durability. In the case of the membrane of (3), the permselectivity between the cations is not only poor but its transport number of cation is also low. In addition, its electric resistance is high and its transport number is low. In the case of the membrane of (4), not only is the electric resistance high but also a satisfactory method of carrying out the lamination of the membranes is not known. On the other hand, in the case of the membrane of (5), the membrane becomes costly since the exchange group is limited to the phosphoric acid type and, in addition, its permselectivity between cations is disappointing. Hence, the demand in the art is for a cation exchange membrane having a much more superior permselectivity between ions of the same sign.

An object of the present invention is to provide an ion exchange membrance which can effect the permeation selectivity of different classes of cations, and particularly cations whose valence is small.

Another object resides in making by a very simple procedure a cation exchange membrane which has the ability to effect the permeation selectivity of cations and which moreover excels in its durability.

A further object is to provide a cation exchange membrane which can effect the permeation selectivity of particularly the cations of smaller valence from among the different classes of cations and, in addition, whose transport number of these cations of smaller valence is great as well as whose electric resistance is small.

Other objects and advantages of the invention will become apparent from the following description.

A cation exchange membrane is provided according to the present invention which is characterized in being a membranous insoluble and infusible organic high-molecular-weight polymer having cation exchange groups chemically bonded thereto and having the dimension of at least 1 centimeter in at least two directions, the substantial surface of said membrane being chemically bonded with acid amide units in an amount indicated by the expression $$A/A+B \times 100 = 15 - 10^{-5}\% \quad (1)$$

wherein A is the number of acids amide bonds in 1 gram of the dry membrane and B is the number of cation exchange groups in 1 gram of the dry membrane, said acid amide units being composed of an amine having at least one amino group containing at least one hydrogen atom bonded to a nitrogen atom and a cation exchange group. The expression $A/A+B \times 100$ will hereinafter be referred to at times as the percent acid amide bonds.

There is no particular restriction as to the cation exchange group that is present in the cation exchange membrane of the present invention as long as it is one possessing a cation exchange capacity. Those preferred, however, are the sulfonic acid, carboxylic acid and phosphoric acid groups, and from the standpoint of economy the sulfonic acid group is most preferred.

Further, in general, the number of sulfonic acid, carboxylic acid and phosphonic acid groups, and other cation exchange groups, that is introduced into the membrance as cation exchange groups, i.e., the exchange capacity, varies depending upon the class of the exchange group as well as the class of the resin. Generally speaking, when the number of cation exchange groups in the membrane is too great, the mechanical strength is decreased and, on the other hand, when it is too small, the electric resistance of the cation exchange membrane increases and moreover the permselectivity between ions of different signs become lower. In the invention cation exchange membrane usually the number of cation exchange groups is most suitably within the range of 0.5–6.0 milliequivalent per gram of the dry membrane (hereinafter will be abbreviated to meq./g. dry memb.).

In the invention cation exchange membrane the matrix of organic high-molecular-weight polymer having chemically bonded thereto the hereinbefore described cation exchange group is imposed no particular restriction as long as it is insoluble and infusible under the conditions of its use as an ion exchange membrane, and hence it may be any resin which meet these requirements. As such a polymeric matrix, the synthetic resin matrices mentioned in (a) to (e), above, which per se are know, can be used. Particularly convenient for achieving the objects of the present invention are the aforementioned resin matrices of (d) and (e), above.

An important feature of the present invention resides in the fact that the cation exchange membrane has bonded to its substantial surface acid amide units composed of an amine having at least one amino group containing at least one hydrogen atom bonded to a nitrogen atom and the aforesaid cation exchange groups, the amount of the acid amide units bonded being at the rate of $15-10^{-5}$ percent based on the number of the cation exchange groups plus the number of the acid amide groups. That is to say, we found that when the acid amide units are chemically introduced to the substantial surface of the cation exchange membrane the acid amide units impart to the cation exchange membrane a property which makes it possible for it to effect the permeation selectivity of the cations of smaller valence and that this permselectivity lasts for a surprisingly long period of time. Further, it was found that the cation exchange membrane having these acid amide units bonded in an amount within the range specified by the present invention had a much smaller electric resistance than the conventional permselective ion exchange membranes, i.e., aforesaid membranes of 1–5 and, in addition, was characterized in that its transport number of the cations of smaller valence was exceedingly great. Furthermore, since in the case of the invention cation exchange membrane it is chemically bonded with amine compounds having a primary or secondary amino group, it is usually possible to use a lesser amount of the aforesaid compound having the amino group than in the case of a cation exchange membrane comprising the conventional cation exchange membrane to which the aforesaid compound has just merely been absorbed (including the ionic bond and hereinafter referred to simply as an absorbed membrane). In addition, the invention cation exchange membrane demonstrates a much more superior permselectivity for the cations of smaller valence and is also outstanding in its durability.

When the proportion of the acid amide units is less than $1 \times 10^{-5}$ percent, the permselectivity for the cations of smaller valence is low, whereas this proportion exceeds 15 percent, not only the electric resistance rises but the transport number decreases as well. While the most convenient proportion for the acid amide units in this invention will vary depending upon the class and molecular weight of amines used in the acid amide bond, it is usually in the range between 10 percent and $10^{-3}$ percent.

While the amines used in the acid amide bond may be those having at least one amino group containing at least one hydrogen atom bonded to a nitrogen atom, usually used are those having a molecular weight of at least 60, and particularly preferred are those whose molecular weight exceeds 200.

As these amines, included are the following:

i. Compounds of the formula

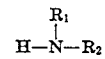

wherein $R_1$ and $R_2$ are each hydrogen with the limitation that when one is hydrogen, the other is not; alkyl, haloalkyl; alkyl substituted by either hydroxy, carboxy, alkoxy, phosphonic acid, sulfonic acid, nitro, nitrile, carbamoyl, sulfonic acid amide or phosphonic acid amide; aryl; aryl substituted by hydroxy, carboxy, phosphonic acid, alkoxy, sulfonic acid, nitro, nitrile, carbamoyl, sulfonic acid amide, carbamoyl or phosphonic acid amide; a heterocyclic group; or aralkyl.

Examples:

diethylamine, butylamine, octylamine, nonylamine, decylamine, dodecylamine, octadecylamine, ethanolamine, diethanolamine, aminopyridine, aniline, nitroaniline, phthalimide, aminobenzophenone, aminosalicylic acid, amino acids, aminonaphthalene-sulfonic acids, amino phenols, aminobenzoic acids, aminonaphthalenes, perfluoro hexylamine and perfluoro laurylamine.

ii. Compounds of the formula

wherein $R_3$ which may be an alkylene group that can be interrupted by either a nitrogen, oxygen or sulfur atom, forms a five or six-membered ring; or $R_3$ may be phthalyl.

Examples:
piperazine, morpholine and alkyl-substituted derivatives, ethyleneimine and alkyl-substituted derivatives, alloxan, imidazole, dialuric acid, barbituric acid, purines, quinazolines, pyrazine, florine.

iii. Compounds of the formula

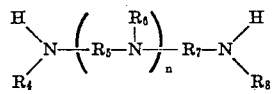

wherein $R_4$, $R_6$ and $R_8$ are each hydrogen, alkyl or aryl, $R_5$ and $R_7$ are each alkylene, and $n$ is a number 0 or 1 or more.

Examples:
ethylene diamine, diethylene triamine, triethylene tetramine tetraethylene pentamine, tetraethylene diamine, triethylene diamine, polyethyleneimine and iv. Polymer having repeating units of the formula

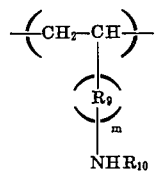

wherein $R_{10}$ is hydrogen or alkyl, $R_9$ is alkylene or phenylene, and $m$ is 0 or 1.

Examples:
polyvinylamine and the N-alkyl derivatives thereof, polyaminostyrene and the N-alkyl derivatives thereof, and polyallylamine and the N-alkyl derivatives thereof.

v. Dyestuff or dyestuff base having at least one primary or secondary amino group.

Examples:
indamines, phenylene blue, safranine, oxazine, Bismarck brown, Auramine conc., magenta and glycidine crystals.

The amines which are particularly effective for achieving the objects of the present invention are those of (iii.) and (iv.), above, e.g., polyethyleneimine, polyvinylamine, polyaminostyrene and polyallylamine. When these amines are used, it becomes possible to fully develop the permselectivity for cations of smaller valence even in those cases where the percent acid amide bonds present in the surface of the cation exchange membrane is in a relatively small amount of $10^{-3}$–1 percent.

While the invention cation exchange membrane will do with a size which is at least 1 centimeter in at least two directions, one whose thickness ranges 0.01–1 centimeter, and particularly 0.01–0.2 centimeter, can be used most economically from the commercial standpoint. If the thickness of the cation exchange membrane becomes thicker than the above-indicated range, while there is the advantage that the mechanical strength generally becomes greater and the ions that escape on account of the diffusion phenomenon decrease, the electric resistance of the membrane increases, with the consequence that its usefulness suffers. On the other hand when the thickness of the aforesaid cation exchange membrane is less than the range specified above, unfavorable results are brought about in that there is an increase in the escape of ions during use due to the diffusion phenomenon and there is a marked decline in the mechanical strength, thus being undesirable from the economical standpoint.

The foregoing cation exchange membrane of the present invention having cation exchange groups and acid amide units chemically bonded thereto can be made by reacting a membrane of an insoluble and infusible organic high-molecular-weight polymer having chemically bonded thereto reactive groups selected from the class consisting of the sulfonic acid halide groups, carboxylic acid halide group, phosphoric acid halide groups and carboxylic acid anhydride groups, with an amine having at least one amino group containing at least one hydrogen atom attached to a nitrogen atom, in a proportion such that the percentage specified by the following equation is satisfied:

$$A/A+B \times 100 = 15-10^{-5}\% \quad (1)$$

wherein
A is the number of acid amide bonds per gram of dry membrane and
B is the number of cation exchange groups per gram of dry membrane;

and thereafter treating the resulting membrane with an aqueous alkaline solution to hydrolyze said remaining reactive groups to cation exchange groups.

In making the invention cation exchange membrane, the method of introducing the reactive groups of acid halide groups or carboxylic anhydride units to the matrix of insoluble and infusible high-molecular-weight organic polymer is not particularly restricted and the methods which per se are known can be employed.

The foregoing insoluble and infusible organic high-molecular-weight polymer having reactive groups chemically bonded thereto can be formed by polymerizing an alpha, beta-ethyleneically unsaturated monomer having the aforesaid acid halide groups or acid anhydride groups, in the presence of other alpha, beta-ethylenically unsaturated monomers, along with an initiator and a cross-linking agent such as divinylbenzene or divinylsulfone. For example, a membrane of a polymer having the acid anhydride units is formed by the radical polymerization of maleic anhydride or itaconic anhydride with a monomer such as styrene or methacrylic acid, and divinylbenzene. In this case, a thermoplastic resin powder such as polyvinyl chloride, polyvinyl acetate and polyethylene can be incorporated in an amount, say, of up to 70 percent by weight of the total weight prior to the polymerization to render the whole into a paste, after which this paste is applied to a substrate, e.g., net or textile fabric or cloth, to form a film which is then polymerized.

Again, a powder of a polymer containing in advance the acid halide group, such as polyethylene halosulfonate, can be admixed with a styrene/divinylbenzene monomeric mixture, after which this mixture is polymerized with an initiator to convert the whole into an insoluble and infusible organic high-molecular-weight membrane.

Alternatively, a membrane of a polymer not containing the cation exchange groups, such as styrene-divinylbenzene copolymer, styrene-vinyl ether-divinylbenzene copolymer, styrene-butadiene copolymer and styrene-methacrylic ester-divinylbenzene copolymer can be reacted with either halosulfonic acid, phosphorus oxyhalide, phosphorus halide or a gas mixture of $SO_2$ and $Cl_2$ to thereby introduce the acid halide groups into the membrane. The reaction conditions may be chosen from the per se known conditions, the choice of the conditions being made to ensure that the acid halide groups are introduced in a range of 0.5–6.0 meq./g. dry memb. In general, a reaction lasting from several tens of minutes to several tens of hours at 0–50° C. will be sufficient.

The starting membrane, i.e., the insoluble and infusible organic highimolecular-weight polymeric membrane, to be used in the present invention can also be made by using the commercially available cation exchange membranes. For example, in using the known cation exchange membrane having the carboxylic acid type of cations as the starting membrane in this invention, the foregoing membrane is reacted with phosphorus halide or thionyl chloride and either all or part of the foregoing carboxylic acid groups are converted to a carboxylic acid halide.

On the other hand, when using the commonly known cation exchange membrane having the sulfonic acid type cation as the starting membrane in this invention, the cation exchange groups of the foregoing sulfonic acid type cation exchange membrane are converted to alkali metal salts and then by reacting these with either phosphorus pentahalide or phosphorus oxyhalide the starting membrane is made into one having a halosulfonic acid group by the introduction thereinto of the halosulfonic acid groups.

Further, in the case where the commonly known cation exchange membranes having the phosphoric acid type cations are used as the starting membrane in this invention, the aforesaid membrane is either reacted with phosphorus halide in the presence of a Friedel-Crafts catalyst to introduce the phosphorus halide groups thereinto, or the membrane, after having been chloromethylated, is reacted with phosphorus halide thereby introducing the phosphorus halide groups thereinto.

According to this invention, the starting membrane having the acid halide groups or carboxylic anhydride units is reacted with the previously described amines. It is extremely important to ensure that the reaction between the amines and the acid halide groups or carboxylic anhydride units takes place in such a manner that the formation of the acid amide bonds occurs only at the substantial surface of the starting membrane. The reason is that when the aforesaid acid amide bond proceeds to the interior of the cation exchange membrane not only the transport number of the resulting cation exchange member declines and also its electric resistance demonstrates a marked increase but also, in extreme cases, its capacity to function as a cation exchange membrane is lost, with the consequence that the achievement of the objects of the present invention becomes impossible.

In the present invention the formation of the acid amide bonds in the interior of the cation exchange membrane can be avoided by ensuring that the amount of amine reacted with the acid halide group or the carboxylic anhydride unit with respect to the acid amide bond formed with the cation exchange group (the unreacted acid halide group or carboxylic anhydride unit becomes a cation exchange group by the next following hydrolysis) becomes a proportion indicated by the previously given equation (1).

The reaction for forming the acid amide bond can be carried out either by dipping the membrane having the acid halide or carboxylic anhydride unit in a solution of an amine in water or alcohols, such as methanol or ethanol, or an organic solvent such as dimethylformamide, or by applying the foregoing solution by other means. While the reaction will vary depending upon the class of amine used and the class of the reactive group of the membrane, generally speaking, a reaction time of 1 minute to 48 hours at a temperature of 2°–80° C. should be sufficient. A concentration of the amine in the solution of at least 0.01 percent, and preferably 0.1–50 percent, is used.

When the acid amine bonds are formed at the surface of the starting membrane or in the neighborhood thereof inclusive of the surface by using a starting membrane in which the acid halide groups have been introduced as the reactive groups and reacting therewith a compound containing at least one primary or secondary amino group, this compound containing the amino group is consumed as a neutralizer as a result of the hydrogen halide that becomes liberated. Hence, if a dehydrohalogenating agent is added to the foregoing reaction system, the concentration in which the compound containing at least one primary or secondary amino group is used can be conveniently reduced, since similar results can be expected. On the other hand when the amount added of the dehydrohalogenating agent is insufficient, the compound containing the at least one primary or secondary amino group, which reacts with the acid halide group introduced into the starting membrane, is consumed as the dehydrohalogenating agent. Hence, in general, the dehydrohalogenating agent is conveniently added in an amount of 0.01–40 percent. As the dehydrohalogenating agent any of those known can be used without any limitations whatsoever provided that they do not have any adverse effects on the aforesaid acid amide conversion reaction. As these dehydrohalogenating agent, generally used with advantage are the compounds having at least one tertiary or quaternary amino group and not having primary or secondary amino groups or the anion exchange solution of the OH type or anion exchange resin of the OH type.

Further, for reducing the electric resistance of the cation exchange membrane obtained in the present invention to a minimum, the presence in the reaction system of at least one water-soluble salt selected from group consisting of the salts of ammonium, and the alkali, alkaline earth and transition metals during the process of imparting the acid amide bond to the starting membrane is advisable, and especially good results are obtained when as the compound having the at least one primary or secondary amino group, as used in the present invention, a high-molecular weight member of said compounds, particularly a polymer having a molecular weight of above 300, e.g., polyethyleneimine, polyvinylamine, polyaminostyrene and polyallylamine, is used. And as the aforesaid metals, the following can be specifically indicated as being most favorably used in this case. As the alkali metals, convenient are lithium, sodium and potassium. As the alkaline earth metals, mention can be made of such, for example, as magnesium, calcium, strontium and barium. On the other hand, as the transition metals, included are the transition metals belonging to groups IV and V of the periodic system of elements, i.e., from Sc having the atomic number 21 to Zn having the atomic number 30 and from Y having the atomic number 39 to Cd having the atomic number 48. Further, there is no particular restriction as to the aforesaid at least one salt selected from those of ammonium and the alkali, alkaline earth and transition metals as long as they are water-soluble salt. Usually usable are the inorganic salts such as nitrates, sulfates, sulfites, nitrites, halogenous salts, perhalogenous salts, halides, oxyhalides and oxysulfates, and the organic salts such as the aliphatic and aromatic carboxylates and sulfonates. It is believed that the addition of these water-soluble salts has the following effects. In the case the water-soluble salt present is that of ammonium, an alkali metal or alkaline earth metal, the aforesaid compound, and particularly the polymer, of high molecular weight having the primary or secondary amino group contracts and becomes reduced in its volume to become fixed in this state in the starting membrane by means of the acid amide bond. On the other hand, when the water-soluble salt present is that of a transition metal, the aforesaid compound having the amino group forms a chelate compound to become set in the starting membrane in this drastically changed state by means of the acid amide bond. Hence, in this latter case, i.e., where a water-soluble slat of a transition metal is used, the compound having the primary or secondary amino group, which is bonded by way of the acid amide bond remains in a state where it has formed a complex with the transition metal, with the consequence that it tends to be inferior in its permselectivity of cations of smaller valence if used in this state. Thus, the foregoing complex is preferably decomposed before using the membrane. Since the decomposition of the complex can usually be readily accomplished by simply treating the membrane with an aqueous solution of low pH, it merely suffices to wash or dip the membrane in an acidic solution after it has been imparted the acid amide bonds. Further, if the amount added of the aforesaid water-soluble salt is too great, the permselectivity between cations of the resulting cation exchange membrane declines and hence is undesirable, whereas when the amount is insufficient, fully satisfactory results are not demonstrated. Hence, usually the amount added of the water-soluble salts of ammonium, alkali metals or the alkaline earth metals is conveniently a range of 0.1–2.5 N (normal), and preferably 0.5–1.0 N, in the reaction system solution. On the other hand, water-soluble salts of transition metals are conveniently added in such a range that the mole ratio of the compound having at least one primary or secondary amino group (PSAC) to the transition metal, i.e., the mole ratio Me/PSAC, is 0.003–0.15. (However, in the case where the PSAC is a polymer such as polyethyleneimine or polyvinylamine, the mole ratio is that of the PSAC as a monomer unit to the Me.)

In accordance with the invention method, the acid amide bond introduced membrane is next treated with an aqueous alkaline solution to hydrolyze the unreacted acid halide or carboxylic anhydride units to cation exchange groups. As the aqueous alkaline solution, usable are the aqueous solutions of caustic alkalis, such as caustic soda and caustic potash, or calcium and barium hydroxides. Thus a cation exchange membrane having cation exchange groups of the alkali metal ion type or alkaline earth metal ion type is obtained. It goes without saying that this cation exchange membrane can be converted to an H-type cation exchange membrane by treatment with an aqueous solution of a mineral acid such as hydrochloric and sulfuric acids. If desired, the starting membrane, after having been imparted the acid amide bonds, can be dipped in a solution of such as $CH_3I$, $CH_3Br$,

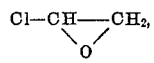

$HCHO$, $BrC_2H_4Br$ or

thereby converting the free amino groups to tertiary or quaternary groups.

As to whether or not the cation exchange membrane has the acid amide bonds can be confirmed qualitatively by the determination of the presence of nitrogen by means of an elemental analysis of the resin powder shaved from the surface thereof.

On the other hand, the quantitative measurement can be made in the following manner. When the amount of acid amide bonds is great, it can be computed from the difference in the ion exchange capacities between the cation exchange membrane which has been imparted the acid amide bonds and a cation exchange membrane not so imparted. In the case where the amount of acid amide bonds is small, the determination can be made by measuring the acid amide absorption band of the infrared absorption spectrum analysis of the whole cation exchange membrane or the powder scraped off its surface by means of, say, steel wool. On the other hand, when a high-molecular-weight electrolytic substance such as, for example, as polyethyleneimine or polyvinylamine, has been used as the compound having at least one primary or secondary amino group, the decrease in the concentration of the aforesaid high-molecular-weight electrolytic substance can be quantitatively measured by means of ultraviolet absorption of complex with transition metals. [For example, J. Polymer Sci. 5 (8) 1,193–2,003 (1967).]

The method of using the invention cation exchange membrane is imposed no particular restrictions, it being possible to use it in the usual electrodialysis. For example, if the concentration of sea water is carried out using the invention cation exchange membrane for selectively removing the monovalent cations from among the cations of different valances, the monovalent ions contained in sea water can be selectively concentrated. Further, when this is usually carried out on a commercial scale, the concentration using electrodialysis is best carried out by arranging such that a plurality of anion and cation exchange membranes are disposed in alternation.

For a more specific illustration of the present invention, the following nonlimitative examples and comparisons are given.

In the examples and comparisons the electric resistance of the cation exchange membrane is a per unit area value obtained by using a 1,000-cycle alternating current in 0.5 N—NaCl solution of 25.0° C.

The transport number is that obtained when the electrodialysis was carried out with a current density of 20 milliampere/cm.$^2$ and 0.5 N—NaCl solutions on both sides of the cation exchange membrane.

On the other hand, the permselectivity designated $T_{M_1}^{M_2}$ was calculated by means of the following equation from ratio of the transport number in the membrane obtained by carrying out the electrodialysis with a mixed salt solution of $CaCl_2$=0.200 N and NaCl=0.200 N. The electrodialysis was carried out in this case at 25° C. and a current density of 20 milliampere/cm.$^2$ with vigorous stirring of the solutions on both sides of the ion exchange membrane.

$$T_{M_1}^{M_2} = (t_{M_1}/t_{M_2})/(C_{M_1}/C_{M_2})$$

wherein $t_{M_1}$ and $t_{M_2}$ each represent the transport numbers of cations $M_1$ and $M_2$ in the ion exchange membrane, and $C_{M_1}$ and $C_{M_2}$ each represent the concentrations of cations $M_1$ and $M_2$ in the solutions.

Further, the pure salt ratio at the time of concentrating sea water was obtained as follows:

pure salt ratio = ([Na]+[K])/[Cl]×100.

Further, the intramembranous ion exchange capacity of the cation exchange membrane was calculated on the basis of the following experiment. After three or four washings of a cation exchange membrane alternately in 1 N—HCl and 0.5 N—NaCl, it is washed four to five times in 1 N—HCl to effect a complete conversion of the cation exchange membrane to the H-type. This cation exchange membrane is then thoroughly washed in water until the methyl orange indicator does not turn red for eliminating the excess hydrogen ions. Next, this cation exchange membrane is placed in pure water and its ion exchange capacity is determined by obtaining the titration curve with a pH meter using 1/10 N—NaOh. The cation exchange membrane whose measurements have been completed in this manner is again immersed in 0.5 N—NaCl and brought to equilibrium, after which it is taken out, allowed to stand for 2 hours in an 80° C. air dryer and then returned to room temperature in a desiccator. This dried membrane is weighed, after which the ion exchange capacity obtained above is divided by the membrane weight to obtain the ion exchange capacity per 1 gram of dry membrane.

Further, the amount of acid amide bonds formed in the cation exchange membrane obtained according to the present invention was determined by the microanalytic method of quantitative analysis unless otherwise indicated. For example, in the case of the invention sulfonic acid type cation exchange membrane imparted the acid amide bonds using polyethyleneimine, the amount of acid amide bonds is determined in the following manner. To a fine powder scraped from the surface of the foregoing cation exchange membrane is added a great excess of acetic anhydride followed by refluxing for 2 hours. Next, the foregoing fine powder is separated by filtration and thoroughly dried under reduced pressure to completely remove the acetic acid and acetic anhydride. The so obtained sample is submitted to infrared analysis by means of the KBr tablet method and the intensity ratio of the absorption peaks of sulfonic acid amine and carboxylic acid amide is obtained. In general, the absorption peak of sulfonic acid amide is observable at about 1,160 cm.$^{-1}$, while the absorption peak of carboxylic acid amide which shifts between 1,740–1,630 cm.$^{-1}$ depending upon the class of the ion exchange membrane usually appears in most cases at about 1,630 cm.$^{-1}$.

Next, benzenesulfonic acid amide and polyethyleneimine of known ratio of primary and secondary amino group content to the total amino group are mixed and dissolved in a solvent (ethyl acetate), following which a great excess of acetic anhydride is added and refluxing is carried out for 2 hours. The solvent and the unreacted acetic anhydride are then removed under reduced pressure and a film is obtained. Three samples in which the mixture ratio of the benzenesulfonic acid amide and the foregoing polyethyleneimine differs are made into samples having the form of a membrane. These are submitted to infrared analysis and calibration curves are plotted. On the basis of these spectra, the amounts of sulfonic acid amide bonded to all the primary and secondary amino groups are calculated. For example, a starting membrane of 130 cm.$^2$/(g. dry memb.), as used in the hereinafter given example 1, is used, and by operating as in example 2 polyethyleneimine which is capable of being adsorbed in an amount of 2 mg./100 cm.$^2$ is bonded to the starting membrane at or in the neighborhood of its surface. Since the molecular weight of $-CH_2-CH_2-NH-$ is 43, the milliequivalent of the polyethyleneimine becomes $2\times(1/43)0.046$ (meq./100cm.$^2$) at this time. Hence the amount of polyethyleneimine which adheres per gram of dry membrane becomes $0.046\times(130/100=0.06$ meq./(g. dry memb.). However, the aforesaid polyethyleneimine contains the primary, secondary and tertiary amino groups in the amounts of respectively 25, 50 and 25 percent, and since the primary and secondary amino groups which are capable of forming the acid amide bond account for 75 percent of the total amino groups, the amount of the polyethyleneimine in the acid amide bond becomes $0.06\times0.75=0.045$ meq./(g. memb.). On the other hand, the amount of acid amide bonded as determined from the infrared analysis of the powder scraped from the surface of the aforesaid cation exchange membrane was seen to be in a proportion of one to each five of the primary or secondary amino groups as a result of a determination using the calibration curve as explained in the previously described microanalytic method of quantitative analysis. Accordingly, the amount of acid amide bonded is 0.45 meq. $\times$ 1/5=0.009 meq./(g. dry memb.), which is about 0.5 percent of the total ion exchange groups, i.e., 1.82 meq./(g. dry memb.).

The number of acid amide bonds in the case of the other amines can also be determined by the same measurements method.

Again, the phosphoric acid amide bonds can also be calculated in like manner. However, in the case of the carboxylic acid amide bonds, since the absorption intensity of carboxylic acid amide increases as a result of the acetic anhydride treatment, the determination is best done from the calibration curve of carboxylic acid amide suitably plotted in advance from the intensity ratio of carbonyl before and after the amide treatment by means of carboxylic acid anhydride.

In the case of the hereinafter given example 1, the amount of acid amide bonded was calculated from the difference in the ion exchange capacities between the cation exchange membrane not imparted the acid amide bonds (No. 1 of table 1) and the cation exchange membrane imparted the acid amide bonds.

EXAMPLE 1

A pasty mixture of 95 parts of styrene, 5 parts of divinylbenzene, 100 parts of finely divided polyvinyl chloride, 25 parts of dioctyl phthalate and 1.5 parts of benzoyl peroxide was applied to a polyvinyl chloride cloth, which was then polymerized by heating at 110° C. for 4 hours to obtain a membranous high-molecular-weight polymer 0.015 cm. in thickness. The divinylbenzene which was of a purity of 50–54 percent, was a mixture of o-, m- and p-divinylbenzene, the rest being ethyl benzene. (This is likewise also in the subsequent examples.) Using the so obtained membranous high-molecular-weight polymer as the starting membrane, this was dipped in a mixed solution consisting of 2 parts of chlorosulfonic acid of above 90 percent purity and 1 part of carbon tetrachloride, where the chlorosulfonation reaction was carried out for 2 hours at 4°–7° C. The resulting chlorosulfonated starting membrane was dipped in an aqueous or methanol solution containing 5 percent of a compound indicated in table 1 having either a primary or secondary amino group under the conditions specified in table 1 to form the acid amide bonds in the surface of the membrane. After completion of the foregoing reaction, the starting membrane was immersed in aqueous 1 N—NaOH solution for 8 hours at room temperature to hydrolyze the unreacted chlorosulfone groups to cation exchange groups. The so obtained cation exchange membrane was then washed thoroughly in 1 N—HCl, 1 N—NaCl and water in the order given. The invention cation exchange membrane was thus obtained. The amount of the acid amide bonds and measurement results of the so obtained cation exchange membrane are shown in table 1.

Item No. 1 in table 1 has been given as a control. The results given here are those of a cation exchange membrane obtained as follows: After the starting membrane has been chlorosulfonated as in the hereinabove described experiment, it is immediately immersed in 1 N—NaOH without imparting the acid amide bonds, i.e., without reacting it with a compound having the primary or secondary amino groups, and this is followed by the hydrolysis of the chlorosulfone groups.

TABLE I

| Number | Compound solution used | | Reaction conditions | | Measurement results | | | |
|---|---|---|---|---|---|---|---|---|
| | Solvent | Class of compound | Temperature (° C.) | Time (hr.) | Acid amide bonds (percent) | $T^{Ca}_{Na}$ | Transport number | Electric resistance ($\Omega$-cm.$^2$) | Exchange capacity (maq./g. dry member) |
| 1 | | | | | | 2.6 | 0.98 | 3.5 | 1.82 |
| 2 | | Diethylamine | 25 | 6 | 9.9 | 1.6 | 0.98 | 10.3 | 1.64 |
| 3 | Water | Diethanolamine | 25 | 10 | 7.6 | 1.3 | 0.92 | 10.0 | 1.68 |
| 4 | Methanol | Diphenylamine | 25 | 24 | 1.6 | 2.0 | 0.98 | 3.6 | 1.79 |
| 5 | do | Phthalimide | 25 | 24 | 3.8 | 2.1 | 0.98 | 3.5 | 1.75 |
| 6 | Water | Piperazine | 25 | 3 | 12.1 | 1.8 | 0.88 | 8.5 | 1.60 |
| 7 | do | p-Aminosalicylic acid | 40 | 24 | 2.2 | 1.5 | 0.97 | 2.6 | 1.78 |
| 8 | do | Dodecylamine | 25 | 2 | 3.3 | 1.5 | 0.88 | 10.5 | 1.76 |
| 9 | do | Tetraethylene pentamine | 25 | 8 | 3.4 | 0.9 | 0.95 | 8.0 | 1.74 |
| 10 | do | Triethylene tetramine | 25 | 5 | 7.8 | 0.7 | 0.90 | 9.5 | 1.68 |
| 11 | Methanol | m-Phenylene diamine | 25 | 24 | 12.6 | 0.6 | 0.88 | 11.0 | 1.59 |
| 12 | Water | Bismarck brown | 25 | 8 | 4.9 | 0.7 | 0.95 | 9.5 | 1.73 |
| 13 | do | Auramine concentration | 25 | 8 | 1.6 | 1.8 | 0.97 | 8.0 | 1.79 |
| 14 | do | Isonicotinic acid hydrazine | 25 | 24 | 2.2 | 1.8 | 0.98 | 8.0 | 1.78 |
| 15 | do | Chrysoidine crystals | 25 | 8 | 1.1 | 2.0 | 0.98 | 3.5 | 1.80 |

EXAMPLE 2

To a starting membrane 0.016–0.017 cm. in thickness as obtained in example 1 were introduced chlorosulfone groups by operating as in example 1. This starting membrane was immersed in aqueous 5 percent polyethyleneimine (hereinafter abbreviated to PEI) for 16 hours at 25° C. to form acid amide bonds in the surface of the membrane. The membrane was then dipped in aqueous 1 N—NaOH solution for 8 hours at room temperature, after which it was thoroughly washed as in example 1 to obtain a cation exchange membrane. The amount of acid amide bonds of the so obtained cation exchange membrane and the results of the measurement of its $T^{Ca}_{Na}$, transport number and electric resistance are shown in table 2. As is apparent from table 2, the molecular weight of PEI had practically no effect, but when compared with the instance of the compounds used in example 1 (table 1) its $T^{Ca}_{Na}$ is clearly superior.

TABLE 2

| No. | Molecular weight of PEI | % acid amide bonds | $T_{Na}^{Ca}$ | transport number | electric resistance ($\Omega$-cm.$^2$) |
| --- | --- | --- | --- | --- | --- |
| 1 | 2000–6000 | 0.3 | 0.5 | 0.97 | 8.0 |
|  | 30,000–40,000 | 0.1 | 0.5 | 0.98 | 8.0 |
|  | 60,000–100,000 | 0.08 | 0.5 | 0.98 | 8.0 | seawater used was adjusted to about 6 by the addition of hydrochloric acid, except for the experiments Nos. 1, 2 and 8, in which case the usual as obtained sea water having a pH 8.2 was used. Further, the results given for experiment No. 15 are those, given by way of comparison, of the instance where the cation exchange membrane not having the acid amide bonds of example 1 (No. 1 of table 1) was used as the cation exchange membrane.

From the results given in table 3 it is obvious that a marked enhanced of the pure salt ratio is demonstrated in the case where the invention cation exchange membrane has been used and further that the durability of the permselectivity of this cation exchange membrane is outstanding.

TABLE 3

| Number | PEI concentration (percent) | Solvent and acid binder Concentration (percent) | Solvent and acid binder Class | Electric resistance ($\Omega$-cm.$^2$) | Transport number | Pure salt ratio (percent) |
| --- | --- | --- | --- | --- | --- | --- |
| 1 | 15 |  | H$_2$O | 7.0 | 0.98 | 97 |
| 2 | 10 |  | H$_2$O | 7.2 | 0.98 | 96 |
| 3 | 5 |  | Methanol | 5.0 | 0.98 | 95 |
| 4 | 5 | 10 | aq Pyridine solution | 2.8 | 0.98 | 92 |
| 5 | 3 | 10 | Pyridine-methanol solution | 2.3 | 0.98 | 91 |
| 6 | 3 | 10 | aq Trimethylamine solution | 5.6 | 0.98 | 92 |
| 7 | 3 | 10 | Trimethylamine-methanol solution | 3.8 | 0.98 | 93 |
| 8 | 3 | 10 | aq Triethanolamine solution | 7.3 | 0.98 | 93 |
| 9 | 3 | 10 | aq Monolauryl dimethylamine solution | 6.8 | 0.98 | 92 |
| 10 | 3 | 10 | aq B-diethylaminoethanol solution | 6.5 | 0.98 | 92 |
| 11 | 3 | 3 | Tri-n-octylamine* | 5.8 | 0.98 | 90 |
| 12 | 3 | 3 | Tri-n-dodecylamine* | 6.2 | 0.98 | 88 |
| 13 | 3 | 2 | Amberlite IRA-400** | 5.4 | 0.98 | 90 |
| 14 | 3 | 2 | Amberlite IR-4B** | 5.0 | 0.98 | 89 |
| 15 |  |  |  | 3.0 | 0.98 | 74 |

*A liquid anion exchange compound of the OH type.
**Tradename of an OH type anion exchange resin.

EXAMPLE 3

Chlorosulfone groups were introduced to a 0.15-mm.-thick starting membrane as in example 2, following which the foregoing chlorosulfone groups were reacted for 16 hours at 25° C. with either an aqueous solution of a concentration indicated in table 3 of PEI having a molecular weight of 5,000 or a mixed solution containing a dehydrohalogenating agent to form the acid amide bonds in the surface of the membrane. The chlorosulfone groups still remaining in the membrane were hydrolyzed with aqueous 1 N—NaOH solution, followed by washing with 1 N—HCl and 1 N—NaCl to obtain a cation exchange membrane. Separately, a paste consisting of 50 parts of 2-methyl-5-vinylpyridine, 30 parts of styrene, 6 parts of divinylbenzene, 15 parts of dioctyl phthalate, 65 parts of finely divided polyvinyl chloride and 2 parts of benzoyl peroxide was applied to Tevylon cloth (trade name of a cloth made from polyvinyl chloride), after which Vinylon film (trade name of a cloth made from polyvinyl chloride), after which Vinylon film (trade name of a film made from polvinyl alcohol) was intimately adhered to both sides of the foregoing cloth and polymerized by heating for 10 hours at 80° C. under pressure. The Vinylon film was then stripped and immersed for 24 hours in a methyl iodide-gasoline (1:4) mixture, followed by thorough washing in methanol and further immersion for 12 hours at room temperature in 5 percent methanol solution of metaphenylene diamine. This was followed by dipping in a 37 percent formalin-hydrochloric acid (2:1) mixture to thus obtain an anion exchange membrane having permselectivity between anions.

A conventional multicompartment cell type brine concentration apparatus was constructed using the foregoing anion and cation exchange membranes, and concentration of sea water was carried out continuously for a 1-year period. The average values of the results obtained for the period beginning 6 months after the start of the concentration operation to the end of the 1-year period are shown in table 3. The pH of the

EXAMPLE 4

A pasty mixture was prepared by adding 100 parts of finely divided polyethylene and 2 parts of benzoyl peroxide to a mixture consisting of 90 parts of styrene, 10 parts of divinylbenzene and 25 parts of dioctyl phthalate. This paste was applied to a net made from polyethylene and polymerized by heating for 4 hours at 110° C. to obtain a membranous high-molecular-weight polymer. Using the so obtained membrane as the starting membrane, the chlorophosphate groups were introduced thereinto by immersing it for 12 hours at room temperature in a solution consisting of 25 moles of phosphorus trichloride and 1.2 moles of anhydrous aluminum chloride. After washing this membrane thoroughly with water, it was dipped for 5 hours at room temperature in a methanol solution containing 5 percent PEI to form the acid amide bonds. The membrane was further dipped for 12 hours at room temperature in 1 N—NaOH to convert the chlorophosphate groups to phosphorous acid groups to thus obtain a cation exchange membrane. The percent phosphorous acid amide bonds of the so obtained cation exchange membrane was 0.05 percent. Further, its transport number was 0.98, its resistance was 7.2 ohm-cm.$^2$ and $T_{Na}^{Ca}$ was 0.6.

EXAMPLE 5

A starting membrane such as used example 1 was immersed for 8 hours at 25° C. in a mixed solution consisting of 600 grams of CCl$_4$, 70 grams of chloromethyl ether and 5 grams of SnCl$_4$, with stirring, after which it was thoroughly washed in methanol. This was followed by immersing the membrane for 8 hours at room temperature in a mixed solution concisting of 25 moles of phosphorus trichloride and 1.2 moles of anhydrous aluminum chloride. The following PEI treatment and subsequent operations were then carried out as in example 4 to obtain a cation exchange membrane having phosphorous acid amide bonds. The percent phosphorous acid amide bonds of the so obtained cation exchange membrane was 0.1 percent, and it had a transport number of 0.98, electric resistance of 6.9 ohm-cm.$^2$ and $T_{Na}^{Ca}$ of 0.6.

EXAMPLE 6

A pasty mixture consisting of 95 parts of methacrylic acid, 5 parts of divinylbenzene, 100 parts of finely divided polyvinyl chloride, 25 parts of dioctyl phthalate and 1.5 parts benzoyl peroxide was applied to a polyvinyl chloride cloth and polymerized by heating for 4 hours at 110° C. to obtain a membranous high-molecular-weight polymer having a thickness of 0.016-0.018 cm., which was used as the starting membrane. Dioctyl phthalate was removed from this membrane by immersing it in methanol for 24 hours at room temperature. This was followed by dipping the membrane for 5 hours at room temperature in a mixed solution consisting of 50 parts of phosphorus trichloride and 50 parts of carbon tetrachloride to introduce the chlorocarboxylic acid group. Next, this membrane was immersed for 12 hours at room temperature in a methanol solution containing 5 percent PEI to form the carboxylic acid amide bonds in the surface portion of the membrane. The membrane was then dipped for 5 hours in water to convert the unreacted chlorocarboxylic acid groups to carboxylic acid to obtain a cation exchange membrane. The percent carboxylic acid amides bonded to this cation exchange membrane was 0.2 percent and its transport number was 0.98, electric resistance was 9.2 ohm-cm.$^2$ and $T_{Na}^{Ca}$ was 0.4.

EXAMPLE 7

A styrene-divinylbenzene copolymer of less than 350 mesh was obtained by the suspension polymerization of styrene and divinylbenzene in customary manner. This copolymer was dipped for 5 hours in chlorosulfonic acid of 10° C. to introduce the chlorosulfone groups, following which 100 parts of the copolymer and 50 parts of finely divided polystyrene were intimately mixed for 30 minutes at 110° C. using mixing rolls to form a 0.2-mm.-thick sheet. This sheet was immersed for 16 hours at 25° C. in a mixed aqueous solution containing 10 percent PEI and 5 percent trimethylamine to form the sulfonic acid amide bonds in the surface of the sheet. This sheet was then dipped in 1 N—NaOH solution to hydrolyze the unreacted chlorosulfone groups to thus obtain a cation exchange membrane (nonhomogeneous membrane) whose percent acid amide bonds was 0.07 percent. The transport number of this cation exchange membrane was 0.92, its electric resistance was 1.43 ohm-cm.$^2$ and $T_{Na}^{Ca}$ was 0.6.

EXAMPLE 8

A 0.3-mm.-thick polyvinyl chloride sheet was immersed for 5 hours at room temperature in a monomeric mixture consisting of 90 parts of styrene, 10 parts of divinylbenzene and 2 parts of benzoyl peroxide. The polyvinyl chloride sheet swelled by this immersion was then sandwiched between sheets of cellophane and polymerized for 4 hours at 80° C. under pressure. The so obtained membranous high-molecular-weight polymer was used as the starting membrane. After introducing the chlorosulfone groups by dipping this membrane in 10° C. chlorosulfonic acid for 3 hours, it was immersed in an aqueous solution containing 10 percent PEI and 5 percent triethanolamine to form the sulfonic acid amide bonds. This was followed by hydrolyzing the unreacted chlorosulfonic acid with 1 N—NaOH to obtain a cation exchange membrane whose percent sulfonic acid amide bonds was 0.5 percent. This cation exchange membrane had a transport number of 0.93, electric resistance of 5.2 ohm-cm.$^2$ and $T_{Na}^{Ca}$ of 0.4.

EXAMPLE 9

The sulfonation treatment of polystyrene was carried out at 95° C. with the ratio of polystyrene to sulfuric acid of 1:10, followed by neutralization with sodium carbonate and thereafter dialyzed using a cellophane membrane. Then trace amounts of salts were eliminated further by means of an ion exchange resin [Amberlite IRA-400 (trade name)] thereby obtaining pure sodium polystyrene sulfonate. A viscous solution was prepared by dissolving 10 parts of this sodium polystyrene sulfonate and 10 parts of polyvinyl alcohol in 20 parts of water. Next, this solution was cast onto a sheet glass and was left standing to cause the moisture to evaporate. The resulting film was stripped from the sheet glass and immersed in a solution in 50 parts of water of 10 parts of chloroacetaldehyde, 20 parts of sulfuric acid and 20 parts of sodium sulfate, thus rendering the film insoluble in water. Next, after thorough drying, this film was dipped in a mixed solution of 100 parts of chloroform and 50 parts of phosphorus pentachloride for 5 hours at 40° C. to convert the sodium sulfonic acid groups to chlorosulfone groups. The sulfonic acid amide bonding operation and subsequent operations were then carried out as in example 8 to obtain a cation exchange membrane whose transport number was 0.98, electric resistance was 3.0 ohm-cm.$^2$ and $T_{Na}^{Ca}$ was 0.2. Further, the surface of this cation exchange membrane was scraped off with steel wool and the presence of sulfonic acid amide bonds was confirmed by means of infrared analysis.

EXAMPLE 10

After thoroughly drying sodium vinylsulfonate, 50 parts thereof was suspended in 150 parts of 0°–5° C. chloroform, after which 85 parts of phosphorus pentachloride was added thereto. This was reacted for 3 hours at 40° C. with thorough stirring, after which it was filtered and the chloroform in the filtrate was removed. The remaining liquid was then washed thoroughly in water to remove the phosphorus pentachloride. This was followed by adding ether and drying using calcium chloride, after which vacuum distillation was carried out adding hydroquinone thereby obtaining vinyl sulfonyl chloride. A mixture of 10 parts of this vinyl sulfonyl chloride, 10 parts of styrene, 2 parts of divinylbenzene and 5 parts of dioctyl phthalate was cast between a pair of sheet glasses and polymerized for 20 hours at 65° C. The membrane obtained in this manner was immersed, as in example 8, in an aqueous solution containing 10 percent PEI and 5 percent triethanolamine to impart the sulfonic acid amide bonds and thereafter hydrolyzed in 10 percent NaOH solution for 6 hours at 85° C. to obtain a cation exchange membrane. The percent sulfonic acid amide bonds in this cation exchange membrane was 0.38 percent, and its transport number was 0.98, electric resistance was 3.0 ohm-cm.$^2$ and $T_{Na}^{Ca}$ was 0.25.

EXAMPLE 11

A pasty mixture consisting of 95 parts of styrene, 5 parts of divinylbenzene, 100 parts of polyvinyl chloride, 20 parts of dioctyl phthalate and 2 parts of benzoyl peroxide was applied to a polyvinyl chloride cloth, and this was then polymerized by heating, as in example 1, to obtain a membranous high-molecular-weight polymer which was used as the starting membrane. This membrane was submitted to a sulfonation treatment for 12 hours at 60° C. using 98 percent concentrated sulfuric acid, and then converted to an Na type using 0.5 N—NaCl. Using this sulfonated membranous high-molecular-weight polymer, it was dipped in a mixed solution of 100 parts of chloroform and 50 parts of phosphorus pentachloride for 3 hours at 40° C. to convert the sulfonic acid groups of the membrane to chlorosulfone groups. Thereafter, by operating as in example 10 this membrane was converted to a cation exchange membrane having sulfonic acid amide bonds. This cation exchange membrane had a transport number of 0.98, electric resistance of 7.4 ohm-cm.$^2$ and $T_{Na}^{Ca}$ of 0.4.

EXAMPLE 12

A pasty mixture was prepared by adding 80 parts of finely divided polyvinyl chloride and 20 parts of chlorosulfonated polyethylene to 100 parts of styrene, 5 parts of divinylbenzene, 20 parts of dioctyl phthalate and 2 parts of benzoyl peroxide. This mixture was applied to a polyvinyl chloride cloth and polymerized by heating for 4 hours at 110° C. The resulting membranous high-molecular-weight polymer was then sulfonated by immersing in 98 percent concentrated sulfuric acid for 8 hours at 60° C. The so obtained membrane was dipped in an aqueous solution containing 5 percent PEI and 10 percent triethanolamine to form the sulfonic acid amide bonds in the membrane, following which the unreacted chlorosulfone groups were hydrolyzed with 1 N—NaOH solution to obtain a cation exchange membrane whose percent sulfonic acid amide bonds was 0.03 percent. The transport number of this cation exchange membrane was 0.98, its electric resistance was 5.3 ohm-cm.$^2$ and its $T_{Na}^{Ca}$ was 0.6.

EXAMPLE 13

A styrene-butadiene copolymer latex (solids content 49 percent) containing 46 parts of styrene was applied to a cloth made of glass fiber. On drying, a membranous high-molecular-weight polymer was obtained, which was used as the starting membrane. After dipping this membrane in a solution containing a Friedel-Crafts catalyst (a solution of 10 parts of anhydrous stannic chloride and 90 parts of carbon tetrachloride) for 4 hours at 30° C., it was immersed for 2 hours in 10° C. chlorosulfonic acid to introduce the chlorosulfone groups into the membrane. Thereafter, by operating as in example 8 a cation exchange membrane was obtained. The transport number of this cation exchange membrane was 0.98, its electric resistance was 7.2 ohm-cm.$^2$ and its $T_{Na}^{Ca}$ was 0.52. The sulfonic acid amide bonds of the cation exchange membrane was confirmed by scraping the membrane with steel wool and analyzing the scraped material by means of infrared spectrum analysis.

EXAMPLE 14

A 0.25-mm.-thick tetrafluoroethylene film was impregnated with styrene by dipping in 60° C. styrene. This film was then sandwiched between sheets of cellophane and polymerized by heating for 3 hours at 80° C. to obtain a membranous high-molecular-weight polymer, which was used as the starting membrane. By operating as in example 8 this membrane was converted to a cation exchange membrane having the sulfonic acid amide bonds. The transport number of this cation exchange membrane was 0.96, its electric resistance was 8.7 ohm-cm.$^2$ and its $T_{Na}^{Ca}$ was 0.2.

EXAMPLE 15

A pasty mixture consisting of 96 parts of vinyltoluene (m-vinyltoluene : p-vinyltoluene = 65:35), 4 parts of divinylbenzene, 100 parts of polyvinyl chloride, 15 parts of dioctyl phthalate and 2 parts of benzoyl peroxide was applied to a polyvinyl chloride cloth and polymerized by heating at 110°C. to obtain a membranous high-molecular-weight polymer, which was used as the starting membrane. After dipping this membrane in a 4° C. mixed solution consisting of 2 parts of chlorosulfonic acid and 1 part of carbon tetrachloride for 1 hour and introducing the chlorosulfone groups thereinto, the operations as in example 12 were carried out to convert the membrane into a cation exchange membrane having the sulfonic acid amide bonds. The transport number of the so obtained cation exchange membrane was 0.98 and its electric resistance was 5 ohm-cm.$^2$ and $T_{Na}^{Ca}$ was 0.3.

EXAMPLE 16

A starting membrane obtained as in example 11 was dipped in 90 percent chlorosulfonic acid at 4° C. to introduce thereinto the chlorosulfone groups. Thereafter, by operating as in example 2 using the polyvinylamine indicated in table 4 under the conditions indicated therein cation exchange membranes were obtained. The hydrolysis of the membrane forming the sulfonic acid amides was however carried out by immersing the membrane in 30° C. 1 N—NaOH solution for 16 hours. Further, in the case of experiments Nos. 2, 4, 5 and 7 of table 4, 10 percent triethanolamine was added to a solution containing polyvinyl amine in carrying out the formation of the sulfonic acid amide bonds.

TABLE 4

| Experiment Number | Polyvinylamine solution | | | Reaction conditions | | Results | | | |
|---|---|---|---|---|---|---|---|---|---|
| | Molecular weight | Concentration (weight percent) | Solvent | Temperature (° C.) | Time (hr.) | Percent acide amide bonds | Electric resistance (Ω-cm.$^2$) | Transport number | Pure salt ratio (percent) |
| 1 | 5,000 | 5 | Water | 27 | 16 | 0.21 | 7.3 | 0.98 | 90 |
| 2 | 5,000 | 5 | do | 27 | 16 | 0.28 | 7.0 | 0.98 | 92 |
| 3 | 5,000 | 10 | do | 27 | 16 | 0.40 | 6.8 | 0.98 | 93 |
| 4 | 5,000 | 10 | do | 27 | 16 | 0.35 | 7.2 | 0.98 | 94 |
| 5 | 30,000 | 10 | do | 24 | 16 | 0.50 | 8.0 | 0.98 | 95 |
| 6 | 5,000 | 8 | Methanol | 30 | 24 | 0.38 | 6.2 | 0.98 | 87 |
| 7 | 5,000 | 8 | do | 30 | 24 | 0.34 | 5.9 | 0.98 | 89 |

EXAMPLE 17

Example 16 was repeated except that a 5 (wt.) percent methanol solution of polyallylamine having a molecular weight of 7,000 was used instead of the polyvinylamine, with the consequence that a sulfonic acid type cation exchange membrane having the sulfonic acid amide bonds was obtained. The percent sulfonic acid amide bonds of this cation exchange resin was 0.32 percent, while its transport number was 0.98, its electric resistance was 6.7 ohm-cm.$^2$ and its pure salt ratio was 88 percent.

EXAMPLE 18

A starting membrane obtained as in example 11 was immersed in a mixed solution consisting of 2 parts of chlorosulfonic acid and 1 part of carbon tetrachloride and reacted for 2 hours at 10° C. to introduce the chlorosulfone groups into the membrane. After washing this membrane thoroughly in sulfuric acids of 80, 40 and 20 percent concentrations, in the order given, to remove the excess chlorosulfonic acid and carbon tetrachloride, it was further washed thoroughly with water. The membrane was then dipped in a methanol solution containing 10 percent of polyaminostyrene (molecular weight 5,000) and 10 percent of triethanolamine for 16 hours at 30° C., thus forming the sulfonic acid amide bonds in its surface. The unreacted chlorosulfone groups of this membrane was then hydrolyzed with 1 N—NaOH solution, after which the membrane was washed twice with 1 N—HCl and 0.5 N—NaOH in alternation, thus obtaining a cation exchange membrane. The electric resistance of this cation exchange membrane was 5.3 ohm-cm.$^2$, while its transport number was 0.92 and pure salt ratio was 88 percent.

EXAMPLE 19

A starting membrane obtained as in example 11 was sealed in with a 1:1 gas mixture of $SO_2$ and $Cl_2$, after which it was exposed to ultraviolet rays for 8 hours to introduce the chlorosulfone groups into the membrane. By operating as in example7 this membrane was converted to a cation exchange membrane. The electric resistance of this membrane was 5 ohm-cm.², its transport number was 0.98 and its $T_{Na}^{Ca}$ was 0.5. Further, when the surface of the so obtained cation exchange membrane was scraped off with steel wool and submitted to infrared analysis, the presence of the acid amide bonds was confirmed.

EXAMPLE 20

A starting membrane obtained as in example 11 was immersed in 10° C. fluorosulfonic acid for 4 hours, thus introducing the fluorosulfone group into the membrane. The membrane was then immersed in an aqueous solution containing 10 percent PEI and 10 percent triethanolamine for 20 hours at 18° C. to form the acid amide bonds. After hydrolyzing the unreacted fluorosulfone groups by dipping this membrane in 1 N—NaOH for 16 hours, it was thoroughly conditioned with 1 N—HCl and 0.5 N—NaOH solutions to obtain a cation exchange membrane whose transport number was 0.98, electric resistance was 7.7 ohm-cm.² and $T_{Na}^{Ca}$ was 0.6.

EXAMPLE 21

A mixed solution obtained by adding 60 parts of dioctyl phthalate to 80 parts of metacrylic acid and 20 parts of divinylbenzene followed by the further addition of 2 percent of benzoyl peroxide was cast between sheets of tetrafluoroethylene and polymerized for 5 hours at 80° C. to obtain a membranous high-molecular-weight polymer, which was used as the starting membrane. The membrane obtained in this manner, after having been removed of the dioctyl phthalate by reflux for 24 hours with methanol, was dipped in a mixed solution consisting of 80 percent of thionyl chloride and 20 percent of carbon tetrachloride for 8 hours at 60° C. The membrane, after removal from the foregoing solution, was immediately immersed in a methanol solution containing 5 percent PEI and 10 percent triethanolamine where it was allowed to stand for 16 hours, whereby the formation of carboxylic acid amide bonds took place in the surface of the membrane. The membrane was then introduced into water to convert the unreacted chlorocarboxylic acid to carboxylic acid to thus obtain a cation exchange membrane whose transport number was 0.98, electric resistance was 9 ohm-cm.² and $T_{Na}^{Ca}$ was 0.4. In the case of a cation exchange membrane which had not received the PEI treatment as in this experiment, i.e., did not have the carboxylic acid amide bonds, the transport number was 0.98, electric resistance was 7–8 ohm-cm.² and $T_{Na}^{Ca}$ was 2.2.

EXAMPLE 22

Sixty parts of dioctyl phthalate and 2 parts of benzoyl peroxide were added to 50 parts of styrene, 50 parts of maleic anhydride and 10 parts of divinylbenzene and the mixture, after being cast between a pair of sheet glasses, was polymerized by heating for 5 hours at 80° C. The membranous high-molecular-weight polymer obtained after removing the sheet glasses was used as the starting membrane. This membrane was immersed in an aqueous solution containing 10 percent PEI and 10 percent triethanolamine for 10 hours at 60° C. to form the carboxylic acid amide bonds between the carboxylic acid anhydride units and PEI. The membrane was then dipped in 1 N—NaOH solution for 10 hours at room temperature to hydrolyze the unreacted carboxylic acid anhydride groups, after which it was thoroughly washed in 1 N—HCl and 0.5 N—NaCl to obtain a cation exchange membrane. The transport number of this cation exchange membrane was 0.93 and its electric resistance was 8.1 ohm-cm.² and $T_{Na}^{Ca}$ was 0.4.

EXAMPLE 23

To a highly viscous solution obtained by dissolving 30 grams of polyvinyl acetate in a mixture of 90 parts of methacrylic acid, 10 parts of divinylbenzene and 30 parts of maleic anhydride were further added 2 parts of benzoyl peroxide and 25 parts of dioctyl phthalate. This solution was applied to a polyvinyl alcohol cloth and polymerized by heating as in example 21 to obtain a membranous high-molecular-weight polymer. This membranous polymer from which dioctyl phthalate was removed by reflux with a methanol solution for 24 hours was used as the starting membrane. By operating thereafter as in example 21 a cation exchange membrane having the carboxylic acid amide bonds was obtained from the foregoing starting membrane. The transport number of this cation exchange membrane was 0.92, its electric resistance was 12.32 ohm-cm.² and its $T_{Na}^{Ca}$ was 0.6.

When the surface of this cation exchange membrane was scraped off with steel wool and the infrared analysis was carried out, the carboxylic acid amide bonds were confirmed at the absorption band of 1,635 cm.⁻¹.

EXAMPLE 24

The membranous high-molecular-weight polymer obtained as in example 11 was used as the starting membrane and chlorosulfone groups were introduced into this membrane by operating the chlorosulfation reaction as in example 1. This membrane was then immersed at room temperature in 98 percent concentrated sulfuric acid for about 10 minutes and subsequently in successively diluted sulfuric acids of 80, 60, 40 and 20 percent concentration for periods of about 10 minutes each in the sequence given, after which it was finally dipped in cold water. This was followed by immersing this membrane in a mixed aqueous solution of the composition indicated in table 5 for 16 hours at room temperature and removing the unreacted foregoing mixed aqueous solution by waterwashing to obtain a membrane having sulfonic acid amide bonds in its surface. This membrane was then dipped in aqueous 2.5 N—NaOH solution for 10 hours at room temperature to convert the unreacted chlorosulfone groups to sulfonic acid groups to thus obtain a cation exchange membrane. This cation exchange membrane was washed repeatedly in 0.5 N—NaCl and 1 N—HCl in alternation for three times and finally dipped in 0.5 N—NaCl solution. When the so obtained cation exchange membrane was measured for its transport number, electric resistance and pure salt ratio, the results were as shown in table 5. In table 5 the salt indicated as Ph(OH)COONa under item No. 10 is an abbreviation of $C_6H_4(OH)COONa$.

TABLE 5

| | Composition of mixed aqueous solution | | | | | | | Results | | |
|---|---|---|---|---|---|---|---|---|---|---|
| | Amine compounds | | | Acid Binder | | Salt Added | | | | |
| Number | Molecular weight | Class | Concentration (percent) | Class | Concentration (percent) | Class | Concentration (N) | Pure salt ratio (percent) | Transport number | Electric resistance (Ω-cm.²) |
| 1 | 20,000–40,000 | PEI | 5 | | | NaCl | 1 | 93 | 0.98 | 3.5 |
| 2 | 5,000 | PVA | 5 | | | NaCl | 1 | 91 | 0.97 | 4.5 |
| 3 | 40,000–60,000 | PEI | 3 | TEA | 10 | NaCl | 2.5 | 85 | 0.98 | 3.5 |
| 4 | 40,000–60,000 | PEI | 3 | TEA | 10 | CaCl₂ | 0.1 | 92 | 0.98 | 4.5 |
| 5 | 40,000–60,000 | PEI | 3 | TEA | 10 | LiCl | 0.5 | 94 | 0.98 | 3.5 |
| 6 | 40,000–60,000 | PEI | 3 | TEA | 10 | LiCl | 1.0 | 93 | 0.98 | 2.5 |
| 7 | 40,000–60,000 | PEI | 3 | TEA | 10 | MgSO₄ | 0.1 | 92 | 0.97 | 4.0 |

TABLE 5—Continued

| | Composition of mixed aqueous solution | | | | | | | Results | | |
|---|---|---|---|---|---|---|---|---|---|---|
| | Amine compounds | | | Acid Binder | | Salt Added | | Pure salt ratio (percent) | Transport number | Electric resistance ($\Omega$-cm.$^2$) |
| Number | Molecular weight | Class | Concentration (percent) | Class | Concentration (percent) | Class | Concentration (N) | | | |
| 8 | 40,000–60,000 | PEI | 3 | TEA | 5 | KNO$_3$ | 0.5 | 90 | 0.98 | 3.5 |
| 9 | 40,000–60,000 | PEI | 3 | TEA | 5 | Na$_2$SO$_4$ | 0.2 | 92 | 0.97 | 3.0 |
| 10 | 40,000–60,000 | PEI | 3 | TEA | 5 | Ph(OH)COONa | 0.5 | 90 | 0.98 | 4.0 |
| 11 | 40,000–60,000 | PEI | 3 | TEA | 5 | C$_6$H$_5$SO$_3$Na | 0.5 | 89 | 0.98 | 3.8 |
| 12 | 40,000–60,000 | PEI | 3 | TEA | 5 | NH$_4$Cl | 0.3 | 93 | 0.98 | 4.2 |
| 13 | 20,000–40,000 | PEI | 5 | TEA | 8 | NaCl | 1 | 94 | 0.97 | 1.9 |

EXAMPLE 25

A starting membrane prepared as in example 24 but using a mixed aqueous solution containing a water-soluble salt of a transition metal, as indicated in table 6, instead of the mixed aqueous solution used in example 24 was treated as in said example to obtain a cation exchange membrane. The so obtained cation exchange membrane was then dipped in 1 N—HCl for 3 hours, and the PSAC not fixed by the acid amide bonds was washed and at the same time the chelate formed was decomposed. The transport number, electric resistance and the pure salt ratio of this cation exchange are shown in the "results" column of table 6. In table 6 $_{Me}$/PSAC indicates the mole ratio of the transition metal (Me) to the polymer having a primary or secondary amino group (PSAC), the mole ratio being that per monomer unit of PSAC. For example, in the case of PEI, it is a value expressed as the mole ratio per

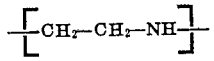

Further, the following abbreviations have been used in table 6. MLDMA denotes monolauryl dimethylamine; TOA n-tri-octylamine; IRA, Amberlite IRA-400 (trade name), an OH-type anion exchange resin; and BSCO, cobalt benzenesulfonate.

A is the number of acid amide bonds per gram of dry membrane, and

B is the number of cation exchange groups per gram of dry membrane, said acid amide bonds being composed of a cation exchange group and an amine having one amino group containing at least one hydrogen atom bonded to a nitrogen atom.

2. The cation exchange membrane of claim 1 wherein said cation exchange group is selected from the class consisting of sulfonic acid, carboxylic acid and phosphonic acid groups.

3. The cation exchange membrane of claim 1 wherein said acid amide bonds are selected from the group consisting of sulfonic acid amide, carboxylic acid amide and phosphoric acid amide.

4. The cation exchange membrane of claim 1 wherein said amine has a molecular weight of at least 200.

5. The cation exchange membrane of claim 4 wherein said amine is selected from the group consisting of compounds of the formula

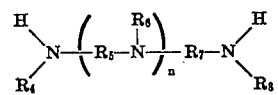

TABLE 6

| | Composition of mixed aqueous solution | | | | | | | Results | | |
|---|---|---|---|---|---|---|---|---|---|---|
| | Polymer having amino group | | | Acid binder | | Water-soluble transition metal salt | | | | |
| Number | Molecular weight | Class | Concentration (percent) | Class | Concentration (percent) | Class | Me/PSAC | Pure salt ratio (percent) | Transport number | Electric resistance ($\Omega$-cm.$^2$) |
| 1 | 40,000–60,000 | PEI | 10 | | | CuSO$_4$ | 0.013 | 94 | 0.98 | 4.2 |
| 2 | 40,000–60,000 | PEI | 5 | TEA | 10 | ZnSO$_4$ | 0.05 | 95 | 0.98 | 3.8 |
| 3 | 5,000 | PVA | 5 | TEA | 5 | CuSO$_4$ | 0.02 | 93 | 0.98 | 4.5 |
| 4 | 40,000–60,000 | PEI | 5 | TEA | 10 | CuSO$_4$ | 0.016 | 94 | 0.98 | 4.5 |
| 5 | 40,000–60,000 | PEI | 5 | TEA | 10 | CuSO$_4$ | 0.125 | 85 | 0.98 | 3.5 |
| 6 | 40,000–60,000 | PEI | 5 | TEA | 10 | Fe$_2$SO$_3$ | 0.008 | 93 | 0.98 | 5.0 |
| 7 | 40,000–60,000 | PEI | 5 | TEA | 10 | Fe$_2$SO$_3$ | 0.017 | 94 | 0.98 | 4.2 |
| 8 | 40,000–60,000 | PEI | 5 | TEA | 10 | Fe$_2$SO$_3$ | 0.03 | 91 | 0.98 | 3.8 |
| 9 | 40,000–60,000 | PEI | 3 | TEA | 10 | CoCl$_2$ | 0.008 | 94 | 0.98 | 4.8 |
| 10 | 40,000–60,000 | PEI | 5 | TEA | 10 | CoCl$_2$ | 0.017 | 92 | 0.98 | 4.2 |
| 11 | 40,000–60,000 | PEI | 5 | TEA | 10 | CoCl$_2$ | 0.033 | 89 | 0.98 | 3.5 |
| 12 | 5,000–10,000 | PEI | 7 | TEA | 10 | TiOSO$_4$ | 0.03 | 91 | 0.98 | 3.9 |
| 13 | 5,000–10,000 | PEI | 7 | TEA | 10 | K$_2$CrO$_4$ | 0.025 | 89 | 0.98 | 3.9 |
| 14 | 5,000–10,000 | PEI | 7 | TEA | 10 | ZrOCl$_2$ | 0.03 | 93 | 0.98 | 3.9 |
| 15 | 5,000–10,000 | PEI | 7 | TEA | 10 | CdSO$_4$ | 0.016 | 94 | 0.98 | 4.3 |
| 16 | 40,000–60,000 | PEI | 5 | Pyridine | 10 | CuSO$_4$ | 0.05 | 93 | 0.98 | 4.6 |
| 17 | 40,000–60,000 | PEI | 5 | MLDMA | 5 | CuSO$_4$ | 0.03 | 92 | 0.98 | 4.3 |
| 18 | 40,000–60,000 | PEI | 5 | TOA | 3 | CuSO$_4$ | 0.02 | 94 | 0.9 | 3.8 |
| 19 | 40,000–60,000 | PEI | 5 | IRA | [1] 20 | CuSO$_4$ | 0.02 | 91 | 0.98 | 4.0 |
| 20 | 40,000–60,000 | PEI | 5 | TEA | 10 | CH$_3$COOCu | 0.05 | 94 | 0.98 | 4.3 |
| 21 | 40,000–60,000 | PEI | 5 | TEA | 10 | BSCO | 0.04 | 91 | 0.98 | 4.0 |

[1] G./l.

We claim:

1. A cation exchange membrane comprising a membranous insoluble, infusible organic high molecular weight polymer having cation exchange groups chemically bonded thereto and having the dimension of at least 1 centimeter in two directions, a substantial portion of the surface of said membrane being chemically bonded with acid amide bonds in a proportion such that the percentage indicated by the following equation is satisfied:

$$A/(A+B) \times 100 = [15-10^{-5}] 1 \times 10^{-5} \text{ to } 15\%$$

wherein wherein $R_4$, $R_6$ and $R_8$ are each selected from the group consisting of hydrogen, alkyl and aryl, $R_5$ and $R_7$ are each alkylene, and $n$ is a number from 0 to 1 or more; and polymers having the repeating unit of the formula

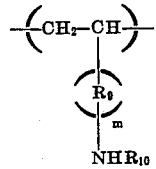

wherein $R_{10}$ is selected from the group consisting of hydrogen and alkyl, $R_9$ is selected from the group consisting of alkylene and phenylene, and $m$ is a number from 0 to 1.

6. The cation exchange membrane of claim 1 wherein said amine is polyethyleneimine.

7. The cation exchange membrane of claim 1 wherein said amine is polyvinylamine.

8. The cation exchange membrane of claim 1 wherein said amine is polyaminostyrene.

9. The cation exchange membrane of claim 1 wherein said amine is polyallylamine.

10. A method of making a cation exchange membrane having chemically bonded cation exchange groups and acid amide groups which comprises reacting an amine having at least one amino group containing at least one hydrogen atom bonded to a nitrogen atom, with an insoluble, infusible organic high molecular weight polymeric membrane having chemically bonded thereto reactive groups selected from the group consisting of sulfonic acid halide groups, carboxylic acid halide groups phosphoric acid halide groups and carboxylic acid anhydride units, in a proportion such that the percentage indicated by the following equation is satisfied:

$$A/(A+B) \times 100 = [.15 - 10^{-5}] 1 \times 10^{-5} \text{ to } 15\%$$

wherein

A is the number of acid amide bonds per gram of dry membrane, and

B is the number of cation exchange groups per gram of dry membrane, and thereafter treating said membrane with an aqueous alkaline solution to hydrolyze the remaining reactive groups to cation exchange groups.

11. The method of claim 10 wherein a water-soluble salt of a cationic constituent selected from the group consisting of ammonium, alkali metals, alkaline earth metals and transition metals is present during the reaction of said membrane having reactive groups with said amine.

* * * * *

UNITED STATES PATENT OFFICE
CERTIFICATE OF CORRECTION

Patent No. 3,647,086          Dated   March 7, 1972

Inventor(s)  MIZUTANI ET AL

It is certified that error appears in the above-identified patent and that said Letters Patent are hereby corrected as shown below:

Page 5, column 10, delete the formula between lines 21 and 23 and insert --
$$T^{m_2}_{m_1} = (t_{m1}/t_{m2})/(C_{m1}/C_{m2})$$
--.

Page 7, in Table 3, Number 10, after "aq", delete "B" and insert -- $\beta$ --.

Page 11, in Table 6, 3rd entry under the heading Electric resistan delete "4.5" and insert -- 4.0 --.

Page 11, in Table 6, 9th entry under the heading Concentration (%) delete "3" and insert -- 5 --.

Page 11, in Table 6, 18th entry under the heading Transport Number delete "0.9" and insert -- 0.98 --.

Signed and sealed this 4th day of July 1972.

(SEAL)
Attest:

EDWARD M. FLETCHER, JR.          ROBERT GOTTSCHALK
Attesting Officer                Commissioner of Patents